(12) United States Patent
Zhang et al.

(10) Patent No.: US 11,597,788 B2
(45) Date of Patent: Mar. 7, 2023

(54) LIGHT CURABLE COMPOSITION

(71) Applicant: Henkel AG & Co. KGaA, Duesseldorf (DE)

(72) Inventors: Heqiang Zhang, Shanghai (CN); Daoqiang Lu, Shanghai (CN); Chongjian Song, Shanghai (CN); Zuohe Wang, Shanghai (CN); Benchi Lu, Shanghai (CN)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 17/225,864

(22) Filed: Apr. 8, 2021

(65) Prior Publication Data
US 2021/0221930 A1   Jul. 22, 2021

Related U.S. Application Data

(63) Continuation of application No. PCT/CN2018/109268, filed on Oct. 8, 2018.

(51) Int. Cl.

| | | |
|---|---|---|
| *C08F 220/56* | (2006.01) | |
| *B33Y 70/00* | (2020.01) | |
| *B33Y 80/00* | (2015.01) | |
| *C08F 2/50* | (2006.01) | |
| *C08K 5/00* | (2006.01) | |

(52) U.S. Cl.
CPC ............ C08F 220/56 (2013.01); B33Y 70/00 (2014.12); B33Y 80/00 (2014.12); C08F 2/50 (2013.01); C08K 5/0041 (2013.01)

(58) Field of Classification Search
CPC ... A61M 339/00; C08F 220/00; C08F 220/18; C08F 220/1181; C08F 220/28; C08F 220/282; C08F 220/343; C08F 220/56; C08F 222/1065; C08F 220/58; C08F 220/54; C08F 220/281; C08F 220/1811; C08F 2/50; C08K 5/0041; C08K 5/45; C08K 5/53; C08L 33/10; C08L 33/26; C08L 37/00; C08L 75/04; C08L 83/06; C08L 2205/035; C08L 2312/06; C09J 4/00; C09J 4/06; C09J 5/00; C09J 2301/416; B33Y 70/00
USPC ............ 522/113, 116, 120, 121, 96, 117, 97
See application file for complete search history.

(56) References Cited

U.S. PATENT DOCUMENTS

| | | | |
|---|---|---|---|
| 10,239,972 | B2 | 3/2019 | Yamada |
| 10,357,435 | B2 | 7/2019 | Lee |
| 10,500,144 | B2 | 12/2019 | Takemoto |
| 10,711,149 | B2 | 7/2020 | Kiyosada |

FOREIGN PATENT DOCUMENTS

| | | | |
|---|---|---|---|
| CN | 105246929 | | 1/2016 |
| CN | 106459316 | | 2/2017 |
| CN | 106866873 | | 6/2017 |
| CN | 107107461 | | 8/2017 |
| CN | 107151482 | | 9/2017 |
| CN | 108348446 | | 7/2018 |
| EP | 3222683 | | 9/2017 |
| EP | 3330306 | | 6/2018 |
| JP | 2014077069 | | 5/2014 |
| JP | 2019001865 | | 1/2019 |
| KR | 20160028137 | A * | 3/2016 |
| WO | 9202572 | | 2/1992 |

OTHER PUBLICATIONS

International Search Report in connection with International Application No. PCT/CN2018/109268 dated Jun. 28, 2019.

\* cited by examiner

*Primary Examiner* — Sanza L. McClendon
(74) *Attorney, Agent, or Firm* — Steven C. Bauman

(57) ABSTRACT

This invention relates to a light curable composition, comprising at least one acrylate monomer, at least one acrylamide compound, at least one acrylate oligomer, and at least one photoinitiator. The light curable composition of the present invention exhibits excellent elongation property after curing and is suitable to be applied for 3D printing.

6 Claims, No Drawings

LIGHT CURABLE COMPOSITION

TECHNICAL FIELD

This invention relates to a light curable composition, comprising at least one (meth)acrylate monomer, at least one acrylamide compound, at least one (meth)acrylate oligomer, and at least one photoinitiator. The light curable composition of the present invention exhibits excellent elongation property after curing and is suitable to be applied for 3D printing.

BACKGROUND OF THE INVENTION

Three-dimensional (3D) printing processes, such as Stereolithography (SLA) and Digital Light Processing (DLP), are based on the layer-wise polymerization of Ultraviolet (UV) sensitive resins. One of the UV sensitive resins widely used for the 3D printing processes is (meth)acrylic based resin. Traditional (meth)acrylic based resins, however, are rigid and have poor elongation property after curing. The products of the traditional (meth)acrylic based resins are fragile, and the application of the products are therefore limited.

Therefore, there is a need for developing a light curable composition having good elongation property after curing, and suitable for 3D printing.

SUMMARY OF THE INVENTION

The present invention relates to a light curable composition, comprising:
(a) at least one (meth)acrylate monomer;
(b) at least one acrylamide compound;
(c) at least one (meth)acrylate oligomer; and
(d) at least one photoinitiator.

The light curable composition of the invention exhibits excellent elongation property after curing and is suitable to be applied for 3D printing.

The present invention also relates to a cured product of the light curable composition. The cured product of the present invention may be in a form of a 3D article formed from the light curable composition printed by a 3D printer.

The present invention also relates to an article bonded by light curable composition.

DETAILED DESCRIPTION OF THE INVENTION

In the following passages the present invention is described in more detail. Each aspect so described may be combined with any other aspect or aspects unless clearly indicated to the contrary. In particular, any feature indicated as being preferred or advantageous may be combined with any other feature or features indicated as being preferred or advantageous.

In the context of the present invention, the terms used are to be construed in accordance with the following definitions, unless a context dictates otherwise.

As used herein, the singular forms "a", "an" and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or process steps.

The recitation of numerical end points includes all numbers and fractions subsumed within the respective ranges, as well as the recited end points.

All references cited in the present specification are hereby incorporated by reference in their entirety.

Unless otherwise defined, all terms used in the disclosing the invention, including technical and scientific terms, have the meaning as commonly understood by one of the ordinary skill in the art to which this invention belongs to. By means of further guidance, term definitions are included to better appreciate the teaching of the present invention.

In the context of this disclosure, a number of terms shall be utilized.

The term "(meth)acrylate" refers to both or any one of "acrylate" and "methacrylate".

The term "(meth)acrylic" refers to both or any one of "acrylic" and "methacrylic".

The term "monomer" refers to a polymer building block which has a defined molecular structure and which can be reacted to form a part of a polymer.

The term "oligomer" refers to a molecule that comprises at least two repeat units.

The term "hydrocarbon group" refers to an organic compound consisting of carbon and hydrogen. Example of hydrocarbon group includes but limited to an alkyl group, such as methyl, ethyl, propyl, butyl, pentyl, hexyl, isopropyl, tertiary butyl, isobutyl and the groups alike; an o alkenyl group, such as vinyl, allyl, butenyl, pentenyl, hexenyl and the groups alike; an aralkyl group, such as benzyl, phenethyl, 2-(2,4,6-trimethylphenyl)propyl and the groups alike; or an aryl group, such as phenyl, tolyl, xyxyl and the groups alike.

The term "optionally substituted" in the term of "optionally substituted hydrocarbon group" means that one or more hydrogens on the hydrocarbon group may be replaced with a corresponding number of substituents preferably selected from halogen, nitro, azido, amino, carbonyl, ester, cyano, sulfide, sulfate, sulfoxide, sulfone, sulfone groups, and the likes.

The term "glass transition temperature" refers to a temperature at which a polymer transitions between a highly elastic state and a glassy state. Glass transition temperature may be measured, for example, by differential scanning calorimetry (DSC).

(Meth)Acrylate Monomer

The light curable composition of the present invention comprises at least one (meth)acrylate monomer. The (meth)acrylate monomer refers to any common (meth)acrylate monomer capable of polymerization, and having at least one group represented by the following general formula:

$$H_2C=C(R)-C(=O)-O-$$

In the formula above, R is a hydrogen or a methyl group.

Illustrative (meth)acrylate monomers include isobornyl acrylate (IBOA), isobornyl methacrylate (IBOMA), tetrahydrofurfuryl acrylate (THFA), (5-ethyl-1,3-dioxan-5-YI) methyl acrylate, cyclohexyl acrylate, cyclohexyl methacrylate, t-butyl acrylate, t-butyl methacrylate, t-butylcyclohexyl acrylate, methyl methacrylate, ethyl methacrylate, propyl methacrylate, phenyl acrylate, phenyl methacrylate, benzyl acrylate, benzyl methacrylate, phenethyl acrylate, phenethyl methacrylate, dicyclopentanyl acrylate, 3,3,5-trimethylcyclohexyl acrylate, 3,3,5-trimethylcyclohexyl methacrylate, dicyclopentenyl acrylate, 1,6-hexanediol diacrylate, 2-ethylhexyl acrylate, n-octyl acrylate, n-nonyl acrylate, n-decyl acrylate, isooctyl acrylate, n-lauryl acrylate, n-tridecyl acrylate, n-cetyl acrylate, n-stearyl acrylate, isomyristyl acrylate, and isostearyl acrylate (ISTA). The (meth)acrylate monomer can be used alone or in any combination.

In some embodiments of the present invention, the (meth)acrylate monomer has a glass transition temperature from −60 to 120° C., preferably from −20 to 120° C., more preferably from 25 to 120° C., and even more preferably from 80 to 100° C. it is surprisingly found that when incorporating (meth)acrylate monomer with proper glass transition temperature, the elongation property of the cured product of the light curable composition can be improved.

Examples of commercially available (meth)acrylate monomers are, for example, SR531, SR508 and SR285 from Sartomer.

In some embodiments of the present invention, the amount of the (meth)acrylate monomer is preferably from 10 to 90%, and more preferably from 40 to 60% by weight based on the total weight of the light curable composition.

Acrylamide Compound

The light curable composition of the present invention comprises at least one acrylamide compound. The acrylamide compound refers to a compound having at least one group represented by $CH_2=CR^4-CO-N$ in each molecule, wherein $R^4$ is a hydrogen or a methyl group. Illustrative acrylamide compounds include 4-acryloylmorpholine (ACMO), N,N-dimethylacrylamide (DMAA), N,N-Diethyl-2-propenamide (DEAA), and N-hydroxyethylacrylamide (HEAA). The acrylamide compound can be used alone or in combination.

In some embodiments of the present invention, the light curable composition preferably comprises at least one acrylamide compound having the amide nitrogen as a member of a cyclic group. The cyclic group may be aromatic heterocyclic groups having 4 to 20 atoms in the cyclic group; and saturated and unsaturated aliphatic heterocyclic groups having 4 to 20 atoms in the cyclic group. The cyclic group may contain additional hetero atoms such as N, O, S, P, and Si other than the amide nitrogen atom. The cyclic group may be optionally substituted with by groups selected from alkyl groups of 1 to 6 carbon atoms, hydroxyl, acyloxy, alkoxy of 1 to 6 carbon atoms, cyano, halo, phenyl, and benzo groups. More preferably, the light curable composition comprises at least one acrylamide compound having the amide nitrogen as a member of a saturated and unsaturated aliphatic heterocyclic group having 4 to 20 atoms in the cyclic group. Even more preferably, the light curable composition comprises at least one acrylamide compound having a structure represented by the general formula (1). It is surprisingly found that when incorporating acrylamide compound having a structure represented by the general formula (1), the elongation property of the cured product of the light curable composition can be further improved.

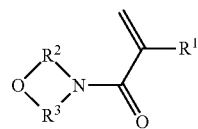

(1)

In the general formula (1), $R^1$ is a hydrogen or a methyl group; $R^2$ and $R^3$ are each independently an optionally substituted divalent hydrocarbon group. Preferably, $R^2$ and $R^3$ are each independently a $C_1$ to $C_{10}$ optionally substituted divalent hydrocarbon group. Examples of the divalent hydrocarbon group include but not limited to a methylene group, ethylene group, and trimethylene group.

Examples of commercially available acrylamide compound, for example, are ACMO™, DMAA™ and DEAA™ from KJ Chemicals corporation.

In some embodiments of the present invention, the amount of the acrylamide compound is preferably from 5% to 80%, and more preferably from 10 to 70% by weight based on the total weight of the light curable composition.

(Meth)Acrylate Oligomer

The light curable composition of the present invention comprises at least one (meth)acrylate oligomer. The (meth)acrylate oligomer refers to an oligomer having at least one acryloyl group or at least one methacrylol group per molecule. Preferably, the (meth)acrylate oligomer has two acryloyl groups or two methacrylol groups per molecule. Illustrative (meth)acrylate oligomer includes a polyurethane (meth)acrylate oligomer, a polyisoprene (meth)acrylate oligomer, a polybutadiene (meth)acrylate oligomer, a polyester (meth)acrylate oligomer and a polyether (meth)acrylate oligomer. The (meth)acrylate oligomer can be used alone or in combination. Preferably, polyurethane (meth)acrylate oligomer is used in the light curable composition of the present invention.

In some embodiments of the present invention, the (meth)acrylate oligomer has a glass transition temperature from −80 to 60° C., preferably from −60 to 20° C., more preferably from −60 to 0° C., and even more preferably from −60 to −10° C. It is surprisingly found that when incorporating (meth)acrylate oligomer having a low glass transition temperature, the elongation property of the cured product of the light curable composition can be further improved.

Examples of commercially available (meth)acrylate oligomers are, for example, BR-3641AJ, BR-3741AJ, BR-3641AA, BR-345, BRC-443, BRC-443D, BRC-843, BRC-843S, BRC-843D, BR7432 GB, BR-641D, BR-641S, BR-744BT, and BR-744SD from Dymax Oligomers & Coatings; CN8881NS, CN8882NS, CN8883NS, CN8884NS, CN8888NS, and CN9014NS from Sartomer; and EBECRYL-230, EBECRYL-231, EBECRYL-242, EBECRYL-244, EBECRYL-246, EBECRYL-4491, EBECRYL-4483, T EBECRYL-8841, EBECRYL-8804, and EBECRYL-6603 from Allnex Group Companies.

In some embodiments of the present invention, the amount of the (meth)acrylate oligomer is preferably from 10% to 90%, and more preferably from 20% to 60% by weight based on the total weight of the light curable composition.

Photoinitiator

The light curable composition of the present invention comprises at least one photoinitiator. The photoinitiator refers to any common photoinitiator and is preferably to include at least one free radical photoinitiator, for example selected from benzophenone, acetophenone, chlorinated acetophenone, dialkoxyacetophenones, dialkylhydroxyacetophenones, dialkylhydroxyacetophenone esters, benzoin acetate, benzoin, benzoin alkyl ethers, dimethoxybenzion, dibenzylketone, benzoylcyclohexanol and other aromatic ketones, acyloxime esters, acylphosphophine oxides, acylphosphosphonates, ketosulfides, dibenzoyldisulphides, diphenyldithiocarbonate, and dipheyl(2,4,6-trimethylbenzoyl) phosphine oxide. The photoinitiator can be used alone or in any combination.

Examples of commercially available photoinitiators include but not limited to Irgacure 184, Irgacure 500, Irgacure 907, Irgacure 369, Irgacure 379, Irgacure 127, Irgacure 1700, Irgacure 651, Irgacure 819, Irgacure 1000, Irgacure 1300, Irgacure 1870, Darocur 1173, Darocur 2959, Darocur 4265 and Darocur TPO, from Ciba Specialty Chemicals; Lucerin TPO, from BASF AG; Esacure KT046, Esacure KIP150, EsacureKT37 and Esacure EDB, from LAMBERTI; H-Nu 470 and H-Nu 470X, from SPECTRA GROUP Ltd.; and Genopol TX-1, from Rahn AG.

In some embodiments of the present invention, the amount of the photoinitiator of the invention is from 0.1% to 8%, preferably from 1% to 5%, and more preferably from 3% to 5% by weight based on the total weight of the light curable composition.

Optional Additives

Fluorescent Brightener

The light curable composition may optionally include at least one fluorescent brightener. The fluorescent brightener includes but not limited to benzoxazole derivatives, bis-benzoxazoles; bis-benzoxazolyl-stilbenes; bis-benzoxazolyl-thiophenes, thiophenediyl benzoxazoles, 2,5-thiophenediylbis-(5-tert-butyl-1,3-benzoxazoles). The fluorescent brightener can be used alone or in combination.

Examples of commercially available fluorescent brighteners include but not limited to Tinopal OB and Uvitex OB, from BASF.

In some embodiments of the present invention, the amount of the fluorescent brightener of the invention is from 0% to 2%, preferably from 0.05 to 1%, and more preferably from 0.05% to 0.5% by weight based on the total weight of the light curable composition.

In a preferred embodiment, the light curable composition comprises:
a) from 10 to 90% by weight of at least one (meth)acrylate monomer;
b) from 5 to 80% by weight of at least one acrylamide compound;
c) from 10 to 90% by weight of at least one (meth)acrylate oligomer;
d) from 0.1 to 8% by weight of at least one photoinitiator; and
e) from 0 to 2% by weight of at least one fluorescent brightener;
the weight percentages of all components add up to 100% by weight.

The light curable composition of the present invention may be prepared by mixing all the components together by any common method and apparatus known in the art.

The light curable composition of the present invention may be cured by actinic ray that has sufficient energy to initiate a polymerization or cross-linking reaction. The actinic ray includes but is not limited to α-rays, γ-rays, ultraviolet radiation (UV), visible light, and electron beams. Preferably, UV radiation and electron beams are used for the curing of light curable composition. More preferably, UV radiation is chosen as the source of energy for the curing of light curable composition. For example, the light curable composition can be cured by UV LED at a wavelength of 405 nm and with an energy of 10-100 mw/cm$^2$ for 1 to 20 seconds. Representative examples of the UV light source include LED UV cure equipment (model 97070, from Loctite Henkel), and Fusion UV equipment (LH6BPS, from Fusion UV System Inc.).

The light curable composition of the present invention may be printed to form a 3D article by the following steps:
a) a digital model of a 3D article to be printed is provided;
b) the digital model of the 3D article is sliced into a number of horizontal planes, and each of the horizontal plane is converted into a two-dimensional image;
c) a layer of the light curable composition is deposited on a surface of the building platform;
d) one two-dimensional image is projected with aid of the actinic ray onto the layer of the light curable composition for curing;
e) another layer of the light curable composition is deposited onto the cured layer of the light curable composition in the previous step; and
f) steps of d) and e) are repeated to form the 3D article.

The light curable composition of the present invention may be printed using a 3D printer, such as Ember from Autodesk; Form 1+ from Formlabs; PR 10 from Henkel; and Lite 100 from Union tech.

The elongation property of the 3D article cured from the light curable composition of the present invention may be assessed according to ASTM638-14.

The 3D article cured from the light curable composition of the present invention preferably has an elongation at break greater than or equal to 100%, more preferably greater than or equal to 120%, and even more preferably greater than or equal to 140%.

EXAMPLES

The present invention will be further described and illustrated in detail with reference to the following examples. The examples are intended to assist one skilled in the art to better understand and practice the present invention, however, are not intended to restrict the scope of the present invention. All numbers in the examples are based on weight unless otherwise stated.

Test Methods

Elongation at Break

The light curable composition was printed to form a 3D article using an Ember printer from Autodesk, by the following steps:
a) a digital model of a 3D article to be printed was provided according to the type V specimen in ASTM638-14;
b) the digital model of the 3D article was sliced into 64 horizontal planes with a height of 0.05 mm for each horizontal plane, and each of the horizontal plane was converted into a two-dimensional image by Autodesk Print Studio software;
c) a first layer of the light curable composition was deposited on a surface of the building platform and was left stand for 5 seconds before being exposed to UV radiation;
d) a first two-dimensional image was projected with aid of the UV radiation at a wavelength of 405 nm and with an energy of 20 mw/cm$^2$ onto the first layer of the light curable composition, and the first layer of the light curable composition was exposed under the UV radiation for 8 seconds;
e) a second layer of the light curable composition was deposited onto the cured first layer and was left stand for 5 seconds before being exposed to UV radiation;
f) a second two-dimensional image was projected with aid of the UV radiation at a wavelength of 405 nm and with an energy of 20 mw/cm$^2$ onto the second layer of the light curable composition, and the second layer of the light curable composition was exposed under the UV radiation for 4 seconds;
g) a third layer of the light curable composition was deposited onto the cured second layer and was left stand for 1.5 seconds before being exposed to UV radiation;
h) a third two-dimensional image was projected with aid of the UV radiation at a wavelength of 405 nm and with an energy of 20 mw/cm$^2$ onto the third layer of the light curable composition, and the third layer of the light curable composition was exposed under the UV radiation for 2.2 seconds;
i) steps g) and h) were repeated for the rest of layers to form the 3D article.

The elongation property of the 3D article formed by the light curable composition was measured according to ASTM D638-14 using Instron Universal test machine at a test speed of 100 mm/min.

The percent elongation at break was recorded.

Example 1-9

A light curable composition was prepared, according to Table 1, by mixing the components selected from:
ACMO (Acryloyl morpholine, available from KJ Chemicals Corporation);
DMAA (N,N-Dimethyl acrylamide, available from KJ Chemicals Corporation);
DEAA (N,N-Diethyl acrylamide, available from KJ Chemicals Corporation);
TPO (2,4,6-Trimethylbenzoyl diphenyl phosphine oxide, Chivacure TPO, available from Chitec Chemical);
Tinopal OB CO (2, 5-thiophenediylbis (5-tert-butyl-1, 3-benzoxazole), available from BASF);
Ebecryl 230 (Aliphatic Urethane Diacrylate, available from Allnex Group Companies, Tg=−55° C.);
BRC 843S (Hydrophobic Urethane Acrylates, available from Dymax Oligomers & Coatings, Tg=−9° C.);
BRC 443D (Hydrophobic Urethane Acrylates, available from Dymax Oligomers & Coatings, Tg=41° C.);
SR 531 (5-Ethyl-1,3-Dioxan-5-YI)Methyl Acrylate, available from Sartomer, Tg=32° C.);
ISTA ((Isostearyl acrylate, NK ESTER S-1800ALC available from Shin-Nakamura Chemical Co., Ltd., Tg=−18° C.);
SR 285 (Tetrahydrofurfuryl acrylate, available from Sartomer, Tg=−15° C.); and
SR 506 (Isobornyl acrylate, available from Sartomer, Tg=88° C.).

TABLE 1

Light curable composition

| | | | | | Weight % | | | | |
|---|---|---|---|---|---|---|---|---|---|
| Components | Ex. 1 | Ex. 2 | Ex. 3 | Ex. 4 | Ex. 5 | Ex. 6 | Ex. 7 | Ex. 8 | Ex. 9 |
| ACMO | 19.4 | 19.4 | | | 19.4 | 19.4 | 19.4 | 19.4 | |
| DMAA | | | 19.4 | | | | | | |
| DEAA | | | | 19.4 | | | | | |
| TPO | 0.4 | 0.4 | 0.4 | 0.4 | 0.4 | 0.4 | 0.4 | 0.4 | 0.4 |
| Tinopal OBCO | 0.2 | 0.2 | 0.2 | 0.2 | 0.2 | 0.2 | 0.2 | 0.2 | 0.2 |
| Ebecryl 230 | 40 | 40 | 40 | 40 | 40 | 40 | | | 40 |
| BRC 843S | | | | | | | 30 | | |
| BRC 443D | | | | | | | | 30 | |
| SR 531 | 20 | 40 | 40 | 40 | | | 50 | 50 | 39.4 |
| ISTA | 20 | | | | | | | | 20 |
| SR 285 | | | | | 40 | | | | |
| SR 506 | | | | | | 40 | | | |

In Table 2, the elongation property of the 3D article formed from the light curable composition is reported. By incorporating acrylamide compound in the light curable composition, the 3D article in Examples from 1 to 8 showed much better elongation at break compared with Example 9. It was further found that when an acrylamide compound having the amide nitrogen as a member of a cyclic group was introduced to the light curable composition, the 3D article exhibited even better elongation at break.

The glass transition temperature of the (meth)acrylate monomer and (meth)acrylate oligomer also played a key role for the elongation property of 3D article formed from the light curable composition. By comparing Example 2, 5, and 6, when incorporating a (meth)acrylate monomer with high glass transition temperature in the light curable composition, the 3D article had better elongation at break. On the contrary, by comparing Example 2, 7, and 8, when incorporating a (meth)acrylate oligomer with low glass transition temperature in the light curable composition, the 3D article had better elongation at break.

TABLE 2

Elongation Property

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Elongation at break (%) | 145 | 170 | 134.45 | 119.55 | 137.36 | 310.13 | 129.42 | 108.5 | 78 |

What is claimed is:

1. A light curable composition comprising:
   (a) from 40 to 60% by weight of at least one (meth) acrylate monomer having a glass transition temperature from −60 to 120° C.;
   (b) from 10 to 70% by weight of at least one acrylamide compound;
   (c) from 20 to 60% by weight of at least one (meth) acrylate oligomer having a glass transition temperature from −80 to 60° C.; and
   (d) from 3 to 5% by weight of at least one photoinitiator; and
   (e) from 0.05 to 0.5% by weight of at least one fluorescent brightener selected from the group consisting of benzoxazole derivatives, bis-benzoxazoles; bis-benzoxazolyl-stilbenes; bis-benzoxazolyl-thiophenes, thiophenediyl benzoxazoles, 2,5-thiophenediylbis-(5-tert-butyl-1,3-benzoxazoles);
   the weight percentages of all components add up to 100% by weight.

2. The light curable composition according to claim 1, wherein the acrylamide compound comprises an amide nitrogen as a member of a cyclic group.

3. The light curable composition according to claim 2, the cyclic group is a saturated or an unsaturated aliphatic heterocyclic groups having 4 to 20 atoms in the cyclic group.

4. The light curable composition according to claim 1, wherein the acrylamide compound has a structure represented by the general formula (1):

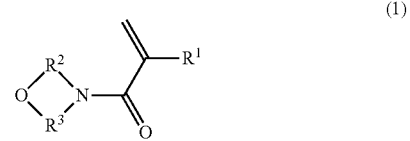

(1)

wherein $R^1$ is a hydrogen or a methyl group; and
$R^2$ and $R^3$ are each independently a $C_1$ to $C_{10}$ optionally substituted divalent hydrocarbon group.

5. A cured product of the light curable composition according to claim 1.

6. An article bonded by a light curable composition comprising a cured product of the light curable composition according to claim 1.

* * * * *